June 2, 1936.   N. A. PALMGREN   2,043,213
PLAIN BEARING
Filed Jan. 19, 1935
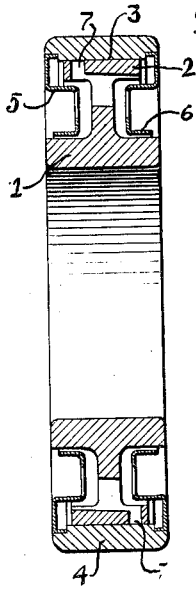
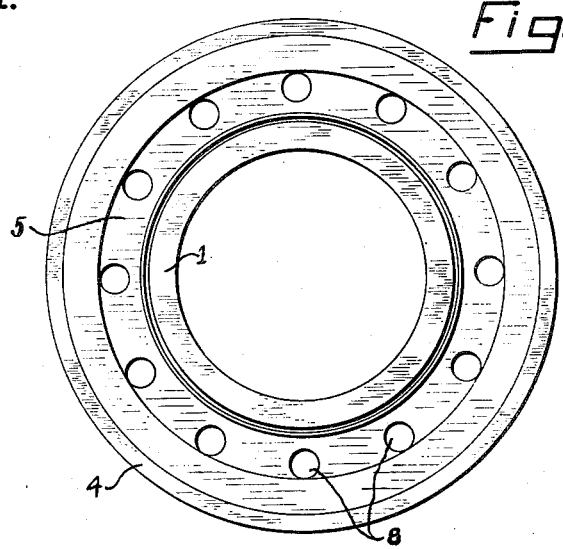
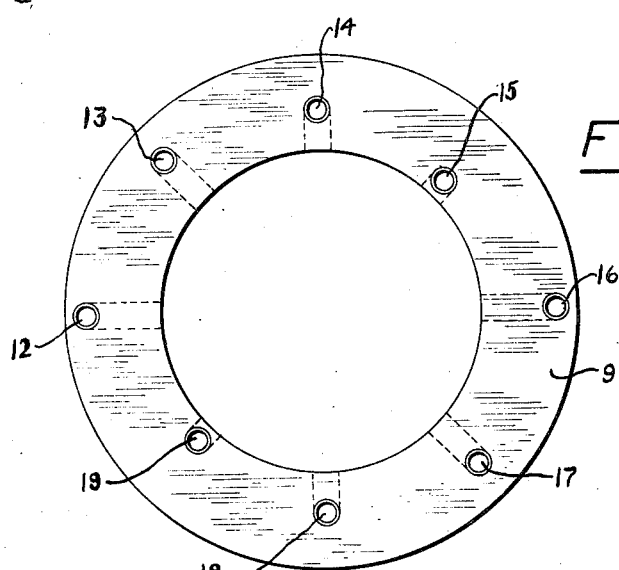
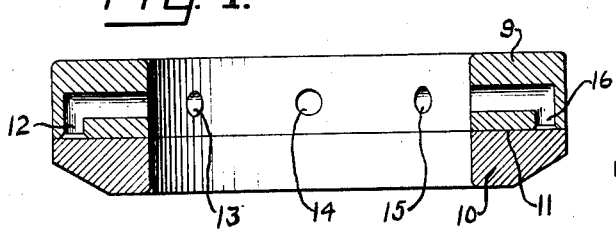
INVENTOR
Nils Arvid Palmgren
BY
his ATTORNEY Patented June 2, 1936

2,043,213

UNITED STATES PATENT OFFICE 2,043,213

PLAIN BEARING

Nils Arvid Palmgren, Goteborg, Sweden, assignor to Aktiebolaget Svenska Kullagerfabriken, Goteborg, Sweden, a corporation of Sweden Application January 19, 1935, Serial No. 2,596
In Sweden April 21, 1934

4 Claims. (Cl. 308—122)

In plain bearings designed to function with complete fluid friction, tilting blocks are resorted to, in order to obtain the relative position of the two sliding surfaces required by the hydrodynamic bearing theory. Bearings with tilting blocks are, however very expensive, especially in the small bearing sizes. It has also been suggested to make bearings without tilting blocks but with sliding surfaces of such a shape that they form slightly wedge shaped oil spaces with constant angle of wedge. These bearings are however also expensive and are furthermore difficult to manufacture and attain satisfactory carrying capacity only under certain determined service conditions.

The present invention relates to a solution of the plain bearing problem rendering it possible to employ bearing surfaces of simple geometrical form, and this invention is partly based on recent observations concerning the modifying effect of the deformation of the material on the practical application of the hydrodynamic bearing theory.

Bearings according to this invention comprise a rotating and a non-rotating bearing ring, with mating sliding surfaces, in which the lubricant is conducted to the sliding surfaces through channels in the rotating bearing ring opening at the sliding surface of the last mentioned bearing ring at points which are staggered in relation to each other in a peripheral direction as well as in the direction across the width of the sliding surface. This arrangement properly carried out can give the bearing complete fluid friction, even though the sliding surface is plane with thrust bearings or has a cylindrical, spherical or other simple geometrical shape in the case of radial bearings.

The invention is illustrated in the accompanying drawing. Figure 1 is a section in an axial plane through a radial bearing according to one embodiment of the invention, and Figure 2 is a side view of the same bearing. Figure 3 is a plan view of the rotating disc in a bearing according to another embodiment. Figure 4 is a section in an axial plane through a thrust bearing according to Figure 3.

In Figures 1 and 2 the bearing comprises an inner bearing ring 1 of I-section the outer flange 2 of which has a cylindrical outer sliding surface 3, an outer bearing ring 4 with inner cylindrical sliding surface fitting the sliding surface 3 of the inner ring with a suitable play and two side discs 5, 6. The flange 20 of the inner ring 1 is provided with a number of oil channels 7, in this case 6 channels, emanating from the inner side of the flange 2 and opening at the sliding surface 3. Channels 21 are formed extending through web 22 of the inner ring to put the sides of the interior of the bearing into communication with each other, preferably the lubricant channels 7, which are shown extending from the inner to the outer surface of the outer flange on both sides of the web of the section, originate at or adjacent to these through channels. The channels are staggered relative to each other in circumferential direction so that they are evenly spaced circumferentially around the bearing periphery. They are furthermore staggered in axial direction, i. e. in the direction of the width of the sliding surface 3. Each channel opening covers its particular part of the sliding surface. The whole width of the sliding surface is lubricated through the channel openings thereby that the openings are staggered in the direction of the width an amount about equal to the width of the openings in the direction mentioned and further thereby that they are evenly distributed over the whole width of the sliding surface. The purpose of such a device would be to enable the bearing to be run in a position in which the bearing is partly immersed in an oil bath, the purpose of the flange being to catch oil and throw it outwardly to the sliding surface, and the purpose of the hole in the web being to provide communication from one side of the bearing to the other to permit of the entrance of lubricant from either side of the bearing and further to permit of radial channels in the central plane of the bearing.

Lubricating oil enters through the apertures 8 of the side discs 5 and 6 and is caught by the inner side of the flange 2 whence it is thrown out through the channels 7, to the sliding surface 3 by the centrifugal force. When the mouth of a channel passes the unloaded zone of the bearing, the clearance space is filled with oil, and this oil is then successively pressed between the sliding surfaces in the loaded zone, whereby a pressure is built up in the oil film carrying the bearing load.

According to the hydrodynamic theory which assumes the bearing material to be rigid it would be expected that the oil should spread out sideways comparatively rapidly and distribute itself over the whole width of the bearing surface, if the channels open at the middle of the sliding surface. Experience has shown, however that this does not occur in the degree calculated, at least not at normal speeds of rotation. The oil emanating from a channel opening has the form of a relatively narrow band. When this band of oil is subjected to load a local impression is caused in the material of the two bearing rings, assuming the form of a groove of equal width to that of the band of oil. This local deformation of the material prevents the oil from spreading to the sides as calculated. In a bearing with channels only in the middle of the sliding surface a proper lubrication of a zone of about only the width of the channel openings is obtained. The oil discharged from one channel opening passes subsequently out through the next channel opening, and the lubrication of the side parts of the sliding surface is insufficient. Furthermore the oil film becomes too thin in the vicinity of the channel openings. The bearing will in a considerable degree function with semi-dry friction.

When now, as shown in Figure 1, the channel openings are staggered peripherally as well as in the direction of the width, each band of oil will cover its part of the width of the sliding surface. At the side of a channel opening, temporarily in the loaded zone, five bands of oil will be under pressure and take over the load from the surface in the immediate vicinity of the opening. The five unbroken oil strings will also have had time to flow well into each other, so that a good film is formed. The surface around a channel opening is consequently carried by the loaded zone of the adjacent parts of the sliding surface so that metallic contact is avoided.

In bearings of the design described it is of utmost importance that the channels be provided in the rotating ring. Only by this means will it be possible to distribute the oil over the whole width of the sliding surface on the unloaded part of the periphery in all positions and under all loading conditions.

Figures 3 and 4 show a thrust bearing according to this invention comprising a rotating upper disc 9 and a lower disc 10. The discs bear against one another with plane sliding surfaces 11. The upper disc is provided with two series of lubricating channels 12, 13, 14, 15 respectively and 16, 17, 18, 19 respectively. All the openings of the channels are staggered in relation to each other, and the two series are staggered 180° peripherally in relation to one another. Within each series the openings of the channels are staggered radially, i. e. in the direction of the width of the sliding surface. The openings of the channels in each series cover practically the whole width of the sliding surface. Oil is conducted to the inner periphery of the top disc and is thrown out to the channel openings in the sliding surface by centrifugal force. Since no unloaded zone exists in a thrust bearing of this kind, the oil must penetrate between the sliding surfaces, while the channel openings are surrounded by an oil film under pressure. This can be accomplished if the openings of the channels are chamfered in a suitable manner.

According to the hydrodynamic theory a bearing of the kind described above would not be capable of carrying any considerable load. As a matter of fact, however, it can take loads of the magnitude 100 kgs. per square centimeter which is quite sufficient for many practical requirements. The reason for this unexpected high carrying capacity is to be found in the above mentioned phenomenon of local deformation of the material so that oil introduced through the opening of a channel will lie in a groove which, altho shallow, is still sufficiently deep to prevent the oil from flowing rapidly out to the sides. It is possible to obtain an unbroken oil film that will prevent metallic contact between the bearing rings, only provided the openings of the channels be staggered as already described.

Having thus described my invention, I claim and desire to secure by Letters Patent:

1. A plain bearing comprising a rotating and a non-rotating bearing ring formed with sliding surfaces bearing against one another, the rotating ring being furnished with channels opening at its sliding surface in holes angularly spaced about the center of the bearing surface, each hole being offset in the direction normal to its path from the adjacent holes a distance substantially equal to its diameter.

2. A plain bearing according to claim 1, characterized by two or more series of channels circumferentially staggered relative to each other and which comprise circumferentially peripherally and in the direction of the width of the sliding surface relative to each other staggered channels.

3. A plain bearing comprising a rotating inner bearing ring having a section of I shape and formed on the periphery of its outer flange with a sliding surface, there being lubricant channels extending from the inner to the outer surface of the flange, the channels opening at its sliding surface in holes angularly spaced about the center of the bearing surface, each hole being offset in the direction normal to its path from the adjacent holes a distance substantially equal to its diameter, the width of the openings being substantially equal to the width of the sliding surface and there being channels through the web to put the sides of the interior of the bearing into communication with each other.

4. A plain bearing comprising a rotating inner bearing ring having a section of I shape and formed on the periphery of its outer flange with a sliding surface, there being lubricant channels extending from the inner to the outer surface of the flange, the channels opening at its sliding surface in holes angularly spaced about the center of the bearing surface, each hole being offset in the direction normal to its path from the adjacent holes a distance substantially equal to its diameter, the whole width of the sliding surface being adapted to be lubricated through the staggered channel openings.

NILS ARVID PALMGREN.